United States Patent Office.

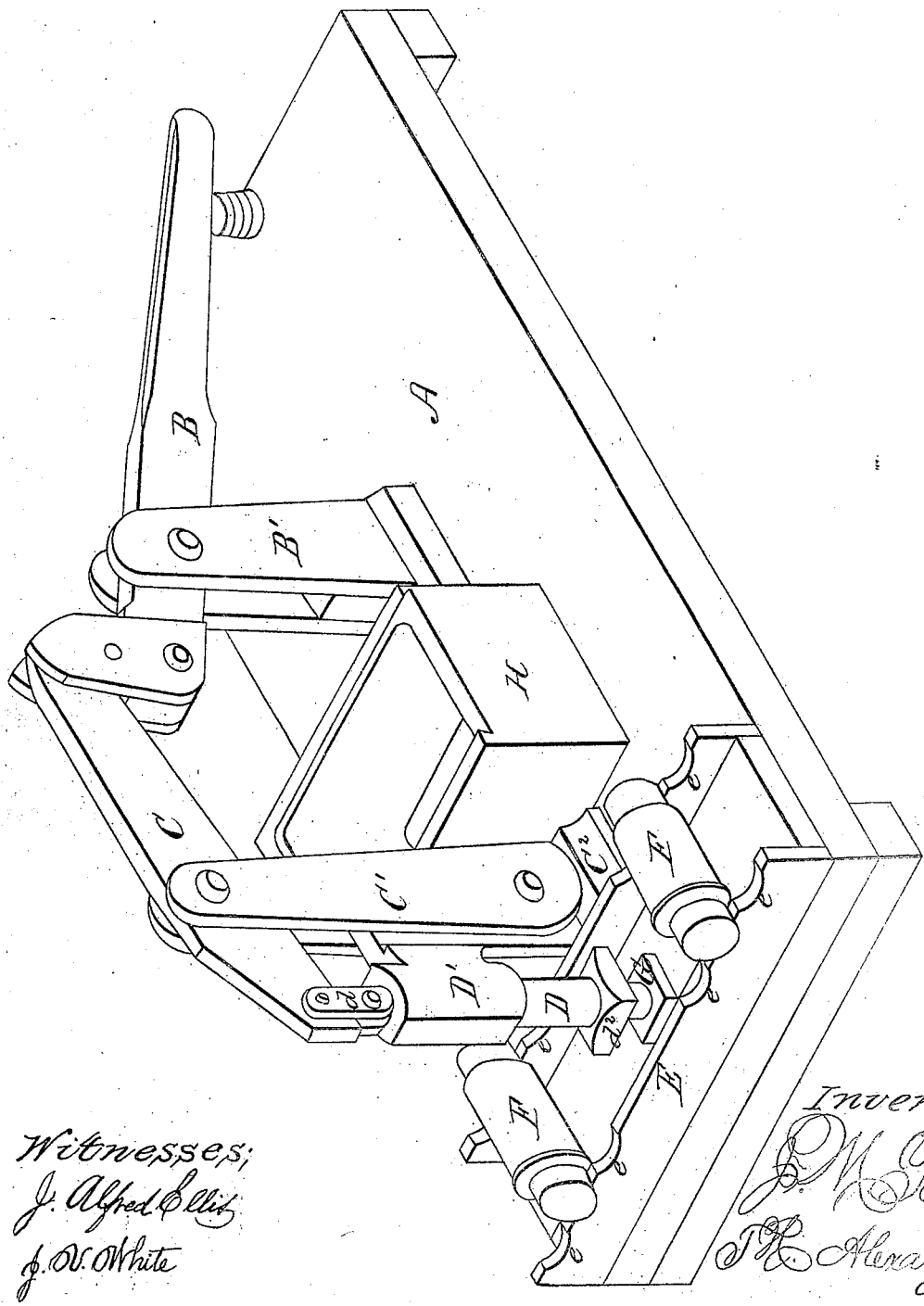

JAMES M. BRYAN, OF PENNINGTONVILLE, PENNSYLVANIA.

Letters Patent No. 78,420, dated June 2, 1868.

---

IMPROVEMENT IN TIRE-BENDING AND PUNCHING-MACHINE.

---

The Schedule referred to in these Letters Patent and making part of the same.

---

TO ALL WHOM IT MAY CONCERN:

Be it known that I, JAMES M. BRYAN, of Penningtonville, in the county of Chester, and State of Pennsylvania, have invented certain new and useful Improvements in Combined Tire-Bending and Punching-Machines; and I do hereby declare that the following is a full, clear, and exact description thereof, reference being had to the accompanying drawings, and to the letters of reference marked thereon, which form a part of this specification, and which represent a view in perspective of my improved tire-bending and punching-machine.

The object of my invention is to provide a machine for bending tires to a desired diameter, and of punching the same, and to this end my improvement consists in combining formers and a graduated rest for giving the desired curvature to the tire, with levers for applying the pressure thereto, as hereinafter described.

In the accompanying drawings, A represents the bed-plate of the machine. An unequal-armed lever, B, is pivoted on a stand, B', secured upon the bed-plate. Its short arm bears, by means of a friction-roller, or in any suitable manner, against the long arm of another unequal-armed lever, C, which is pivoted at its fulcrum to the links C¹. These links are pivoted at their opposite ends to a stand, C², which has upon it a long bearing, D', in which a mandrel, D, moves vertically. The upper end of the mandrel is connected by the links $d$ to the short arm of the lever C, and to its lower end is secured the bending-die $d^2$. A rest, E, extends across the bed-plate beneath the mandrel, and has upon it bearings, $e\ e$, of greater or less number, according to the range of diameters to be bent. Cylindrical formers, F F, can be placed in the bearings $e\ e$, and rest upon them by journals upon their ends.

A punching-die, G, is inserted in a hole in the rest E, immediately beneath the mandrel, when the machine is to be used as a punch. A box, H, upon the bed-plate, serves as a receptacle for the dies when not in use. A stop, H', is placed beneath the lever B.

The operation of the machine is as follows: The formers F are placed in the bearings $e$ of the rest, and at equal distances from the bending-mandrel, and the tire-bar laid upon them. Power being then applied to the lever B, it raises the long end of the lever C, against which it bears, and depresses the short end, to which the mandrel D and die $d^2$ are attached. This pressure acting on the tire between the formers F F, which support it, bends it to a curve, the radius of which will be greater in proportion as the formers F F are placed further apart.

When it is desired to use the machine as a punch, a die of the desired size and form is inserted in a hole in the rest, immediately beneath the mandrel, and the tire placed between them, when, by pressure upon the lever B, a hole corresponding to the die used will be punched in it. The stop H' prevents the mandrel and its die from descending too far.

I do not claim any of the devices herein shown and described separately, for they are all old and well known, but I do claim—

1. The arrangement, herein described and shown, of the levers B and C, supports B' and D', and stirrups C' and $d$, for the purposes set forth.

2. The arrangement, herein described, of the rest E, rollers F F, adjustable die $d^2$, and mandrel D, for the purposes set forth.

In testimony that I claim the foregoing as my own, I affix my signature in presence of two witnesses.

JAMES M. BRYAN.

Witnesses:
SIMEON S. WARNER,
RILLA W. BRINTON.